United States Patent
Neveri

(10) Patent No.: US 11,909,254 B2
(45) Date of Patent: Feb. 20, 2024

(54) MOTOR VEHICLE CONTROL DEVICE HAVING A SWITCH-ON AND SWITCH-OFF FUNCTION FOR AT LEAST ONE ELECTRICAL CONSUMER THAT IS TO BE CONTROLLED BY THE MOTOR VEHICLE CONTROL DEVICE

(71) Applicants: thyssenkrupp Presta AG, Eschen (LI); thyssenkrupp AG, Essen (DE)

(72) Inventor: Adam Neveri, Ajka (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 261 days.

(21) Appl. No.: 17/436,235

(22) PCT Filed: Mar. 2, 2020

(86) PCT No.: PCT/EP2020/055454
§ 371 (c)(1),
(2) Date: Sep. 3, 2021

(87) PCT Pub. No.: WO2020/178245
PCT Pub. Date: Sep. 10, 2020

(65) Prior Publication Data
US 2022/0158478 A1    May 19, 2022

(30) Foreign Application Priority Data
Mar. 7, 2019   (DE) ............... 10 2019 203 111.0

(51) Int. Cl.
*H02J 9/06*    (2006.01)
*B60R 16/03*   (2006.01)
(Continued)

(52) U.S. Cl.
CPC ............... *H02J 9/06* (2013.01); *B60R 16/03* (2013.01); *B62D 5/0457* (2013.01); *B62D 15/021* (2013.01)

(58) Field of Classification Search
CPC .......... H02J 9/06; B60R 16/03; B62D 5/0457; B62D 15/021
See application file for complete search history.

(56) References Cited

U.S. PATENT DOCUMENTS

| 2003/0098211 A1 | 5/2003 | Saito et al. |
| 2003/0222499 A1 | 12/2003 | Ely et al. |
| 2011/0025123 A1 | 2/2011 | Tsai |
| 2011/0234177 A1 | 9/2011 | Kohara et al. |

(Continued)

FOREIGN PATENT DOCUMENTS

| CA | 1193971 A | 9/1985 |
| CN | 102198799 A | 9/2011 |

(Continued)

OTHER PUBLICATIONS

English Translation of International Search Report issued in PCT/EP2020/055454, dated Jun. 8, 2020.

*Primary Examiner* — Robert L Deberadinis
(74) *Attorney, Agent, or Firm* — thyssenkrupp North America, LLC

(57) ABSTRACT

A motor vehicle control device may have a switch-on and switch-off function for at least one electrical load to be controlled by the motor vehicle control device. The motor vehicle control device may include an electronic switching element for arrangement in a supply voltage path of the electrical load and a control unit for controlling the electronic switching element. The control unit is designed to provide a control signal for switching the electronic switching element based on at least one input signal. The control unit may include a resistor connected to the supply voltage path and a current control means connected in series there- (Continued)

with for generating a predefinable voltage difference at the resistor as the control signal for the electronic switching element.

8 Claims, 3 Drawing Sheets

(51) Int. Cl.
*B62D 5/04* (2006.01)
*B62D 15/02* (2006.01)

(56) References Cited

U.S. PATENT DOCUMENTS

| | | | |
|---|---|---|---|
| 2015/0069829 A1 | 3/2015 | Dulle et al. | |
| 2017/0197566 A1 | 7/2017 | Nakamura et al. | |
| 2018/0048142 A1 | 2/2018 | Immel et al. | |

FOREIGN PATENT DOCUMENTS

| | | | |
|---|---|---|---|
| CN | 203739810 U | 7/2014 | |
| CN | 105128779 A | 12/2015 | |
| CN | 107706882 A | 2/2018 | |
| DE | 100 08 266 A1 | 8/2001 | |
| DE | 103 53 476 A1 | 6/2005 | |
| DE | 102006052318 A1 * | 5/2008 | ............... H02J 3/14 |
| DE | 10 2008 043 835 A1 | 5/2010 | |
| DE | 20 2010 008 060 U1 | 10/2010 | |
| DE | 10 2011 122 042 A1 | 8/2012 | |
| DE | 10 2014 214 103 A1 | 1/2016 | |
| DE | 10 2017 203 211 A1 | 8/2018 | |
| JP | S6382848 A | 4/1988 | |
| JP | H08205388 A | 8/1996 | |
| JP | 2010-047249 A | 3/2020 | |
| KR | 101479076 B1 | 1/2015 | |
| TW | I 596887 A | 8/2017 | |

* cited by examiner

MOTOR VEHICLE CONTROL DEVICE HAVING A SWITCH-ON AND SWITCH-OFF FUNCTION FOR AT LEAST ONE ELECTRICAL CONSUMER THAT IS TO BE CONTROLLED BY THE MOTOR VEHICLE CONTROL DEVICE

CROSS REFERENCE TO RELATED APPLICATIONS

This application is a U.S. National Stage Entry of International Patent Application Serial Number PCT/EP2020/055454, filed Mar. 2, 2020, which claims priority to German Patent Application No. DE 10 2019 203 111.0, filed Mar. 7, 2019, the entire contents of both of which are incorporated herein by reference.

FIELD

The present disclosure generally relates to motor vehicle control devices having switch-on and switch-off functionality for certain electrical loads.

BACKGROUND

As a result of the increasing number of electrical loads in motor vehicle electrical systems, it is desirable to limit the current consumption of loads which are temporarily not required so that the state of charge of the vehicle battery suffices to operate the motor vehicle even after relatively long service lives. One possible way of limiting the quiescent current requirement of control devices in the vehicle electrical system is to provide a standby or sleep mode. This is advantageous, in particular, for those control devices which provide functions of the motor vehicle, which are occasionally required even when the ignition is switched off, and therefore must remain permanently connected to the vehicle battery.

In order to reduce the quiescent current requirement, DE 100 08 266 A1 also discloses the practice of switching individual control devices on and off by means of an apparatus. The apparatus makes it possible, in the switched-off state, to switch off the complete voltage supply for the control device and to therefore disconnect it from the vehicle electrical system. In the event of a failure and in the event of undervoltage in a supply voltage path, a voltage detection means ensures that a second supply voltage path is connected in order to cover the energy requirement of the load.

DE 10 2011 122 042 A1 describes a further circuit arrangement for an electrical system of a vehicle, in which a first control device can be electrically decoupled from the vehicle battery by means of an isolating switch and the isolating switch can be controlled by means of a second control device in order to electrically couple the at least one electrical load and the first control device to the vehicle battery again.

However, individual control devices installed in motor vehicles contain control electronics both for functions which need to be temporarily provided and for functions which need to be permanently provided, which is why these control devices must not be disconnected from the vehicle electrical system in order to reduce the quiescent current requirement. Such motor vehicle control devices include, for example, control devices for steering systems which must provide steering assistance only during operation of the motor vehicle, whereas changes to the steering angle of the steered wheels must also be able to be determined while stationary. This applies, in particular, to steer-by-wire steering systems.

The disadvantage of the previously known solutions is therefore that they can be used only for those control devices which can be completely disconnected from the vehicle electrical system at least temporarily when the ignition is switched off.

Thus a need exists for a motor vehicle control device which further reduces the quiescent current consumption in a vehicle electrical system and, at the same time, has a simple and cost-effective structure.

DETAILED DESCRIPTION

Figure 1:
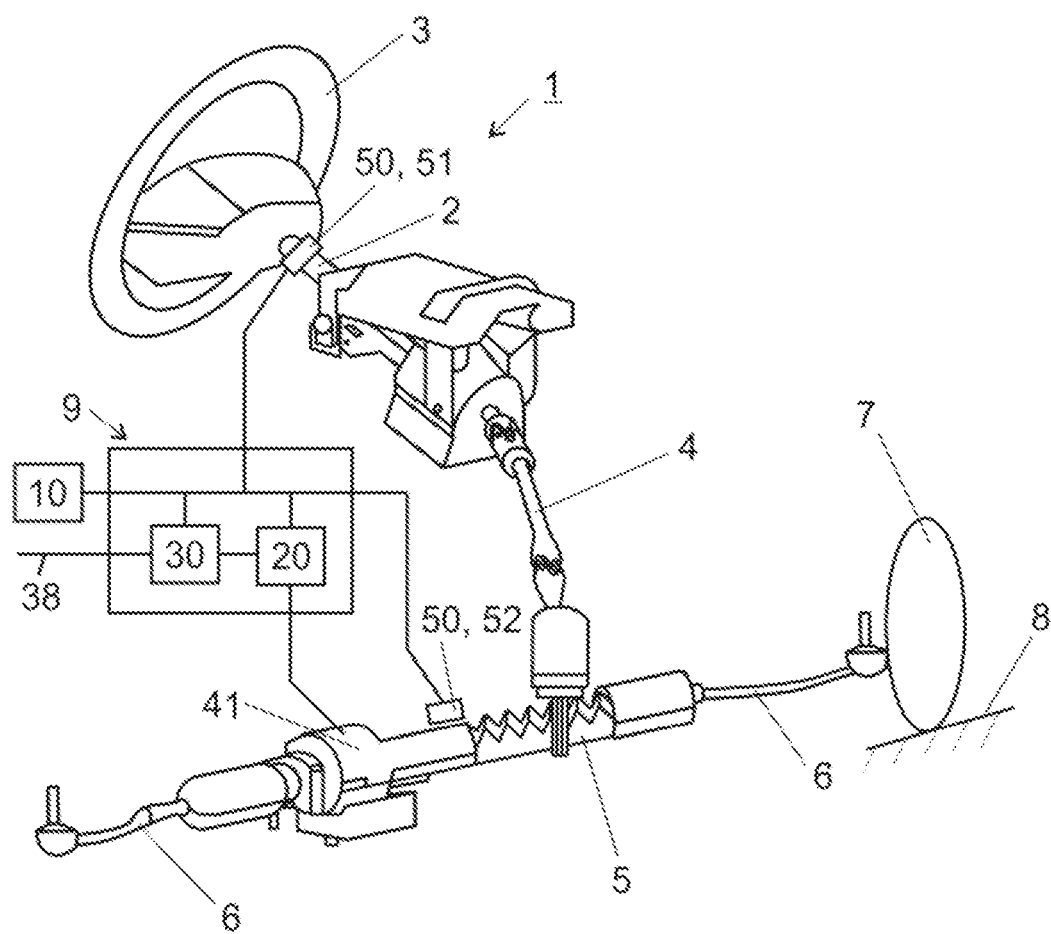
FIG. 1 is a schematic view of a motor vehicle steering system having an example motor vehicle control device.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

This provides a motor vehicle control device having a switch-on and switch-off function for at least one load to be controlled by the motor vehicle control device. The motor vehicle control device comprises an electronic switching element for arrangement in a supply voltage path of the load and a control unit for controlling the electronic switching element. The control unit is designed to provide a control signal for switching the electronic switching element on the basis of at least one input signal.

The motor vehicle control device according to the invention implements a switch-on and switch-off function for individual loads in the vehicle electrical system at the level of the control devices. As a result, the motor vehicle control device can temporarily disconnect individual loads, which are temporarily not required for the control task, from the supply voltage. This is advantageous, in particular, for components and circuits which themselves do not have an energy-saving mode. A respectively present motor vehicle state is detected on the basis of the at least one input signal. This makes it possible to minimize the current consumption of the motor vehicle control device, in particular when the ignition is switched off.

The control unit preferably comprises a resistor connected to the supply voltage path and a current control means connected in series therewith for generating at least one predefinable voltage difference at the resistor as the control signal for the electronic switching element. The current control means can be used to tap off a voltage difference at the resistor, which voltage difference is independent of the fluctuating vehicle electrical system voltage in the supply voltage path. The load is switched on and off in a consistent and controlled manner irrespective of the vehicle electrical system voltage. Indifferent switching states of electronic switching elements, as may arise, in particular, in uncontrolled circuits as a result of undervoltages or overvoltages, are avoided. The need to check the switching state by means of an additional sensor is also dispensed with.

The current control means may comprise, for example, a bipolar transistor having negative feedback. In this case, the bipolar transistor forms the necessary negative feedback of the control loop of the current control means, which counteracts a change in the current flowing through the resistor on account of voltage changes in the vehicle electrical system. In an embodiment of particularly simple construction, the base of the bipolar transistor is connected, via a voltage divider, to a controlled voltage source which provides a controlled output voltage on the basis of the input signal. The base of the transistor is therefore held substantially at a constant voltage level, with the result that the circuit operates reliably over the entire range of expected vehicle electrical system voltages.

The electronic switching element is preferably a MOSFET which can be controlled by way of the voltage difference which can be tapped off at the resistor as a gate-source voltage. A MOSFET is particularly well suited as a switching element on account of the low losses and its fast switching behavior.

The input signal may be, in particular, an ignition signal of the motor vehicle. In this case, the switching state of the ignition switch, and therefore an indicator of the motor vehicle state, is directly communicated to the control device via the input signal.

The motor vehicle control device may additionally have a second supply voltage path for the uninterrupted power supply of direct loads to be controlled by the motor vehicle control device. Such a motor vehicle control device makes it possible to disconnect the control electronics of vehicle functions which are temporarily not required from the vehicle electrical system, while other loads which are controlled by the same motor vehicle control device are still supplied with voltage and at best themselves change to an energy-saving mode.

In the case of the motor vehicle control device, at least one of the direct loads and/or one of the switchable loads may be preferably integrated in the motor vehicle control device. In particular, the switchable loads and/or the direct loads may be control electronics for sensors and/or actuators which can be connected to the motor vehicle control device or are integrated in the latter.

For example, the motor vehicle control device may be the control device of a steering system. At least one of the direct loads may then be a steering angle sensor of the steering system. The switchable load may be, for example, a steering actuating drive of the motor vehicle.

FIG. 1 schematically illustrates a motor vehicle steering system 1 having a motor vehicle control device 9 according to the invention which is used to control the steering system 1. The steering system 1 has a steering wheel 3 fastened to an upper steering shaft 2.

The steering wheel angle input at the steering wheel 3 is transmitted, via the upper steering shaft 2 and the lower steering shaft 4, to a steering gear 5 which converts the steering angle into a translation of a toothed rack. The toothed rack is connected, via tie rods 6, to the steered wheels 7 which are in contact with the road 8.

The steering system 1 is controlled by the motor vehicle control device 9. The motor vehicle control device 9 is connected to a supply voltage source 10 which provides the power supply for the control device 9 and the components connected to the latter. The motor vehicle control device 9 contains an electronic switching element 20 and a control unit 30 which can switch the switching element 20 on and off on the basis of an input signal 38 using a control signal. In the exemplary embodiment illustrated, the input signal 38 is the ignition signal of the motor vehicle.

The electronic switching element 20 is arranged in the voltage supply path of a load in the form of a steering actuating drive 41. The steering actuating drive 41 can therefore be disconnected from the supply voltage source 10 by switching the electronic switching element 20. Furthermore, steering angle sensors 51, 52 are connected to the motor vehicle control device as direct loads 50 via a second voltage supply path. The second voltage supply path preferably does not contain a switching element, with the result that an uninterrupted voltage supply for the direct loads is ensured by the supply voltage source 10.

The direct loads 50 are provided, in particular, for motor vehicle functions which must always be available. In order to further reduce the quiescent current requirement, the direct loads 50 preferably have a standby or sleep mode. The standby or sleep mode has the advantage of a low current consumption with, at the same time, the ability to quickly wake up the loads 50.

Even if the exemplary embodiment shown relates to an electromechanical motor vehicle power-assisted steering system, the motor vehicle control device according to the invention can be used in the same manner in a steer-by-wire steering system or an electrohydraulic power-assisted steering system.

Figure 2:
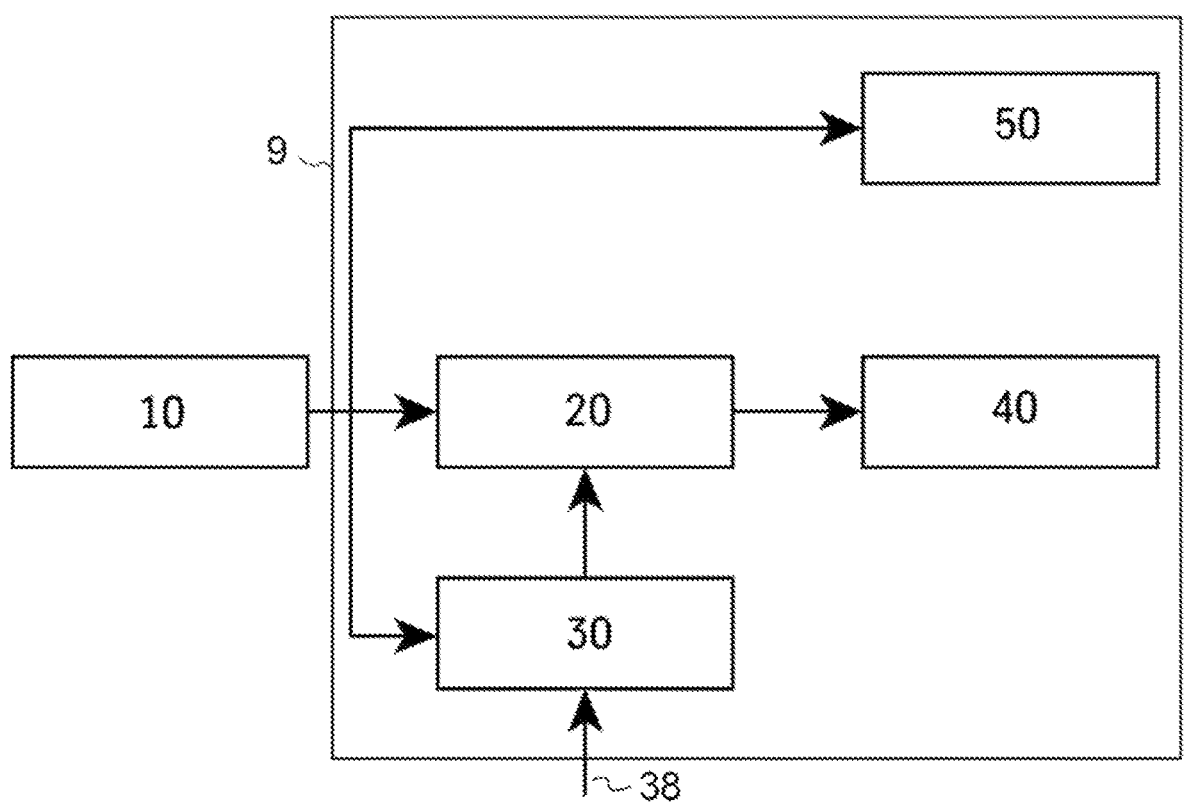
FIG. 2 is a schematic view of another example motor vehicle control device.

FIG. 2 schematically shows a block diagram of the structure of a second exemplary embodiment of the motor vehicle control device according to the invention. The diagram shows a motor vehicle control device 9 which is connected to a supply voltage source 10, for example a battery. The motor vehicle control device 9 contains integrated switchable loads 40 and integrated direct loads 50. The motor vehicle control device 9 also contains an electronic switching element 20, which can disconnect the loads 40 from the power supply 10 or can connect them to the latter, and a control unit 30 which is intended to control the switching element 20. If the input signal 38 for the control unit 30 is an ignition signal 38 of the motor vehicle, the control unit 30 may switch on the switching element 20, for example when the ignition is switched on, with the result that the loads 40 are supplied with current, and may switch off the switching element 20 when the ignition is switched off, with the result that any current consumption by the loads 40 is prevented.

In contrast to the exemplary embodiment according to FIG. 1, both the switchable loads 40 and the direct loads 50 are therefore integrated in the motor vehicle control device 9. The loads 40 and 50 may be, for example, control electronics for connected or integrated sensors and actuators. With respect to a motor vehicle steering system, they may be, as in the first exemplary embodiment, a steering actuating drive 41 and steering angle sensors 51, 52.

Figure 3:
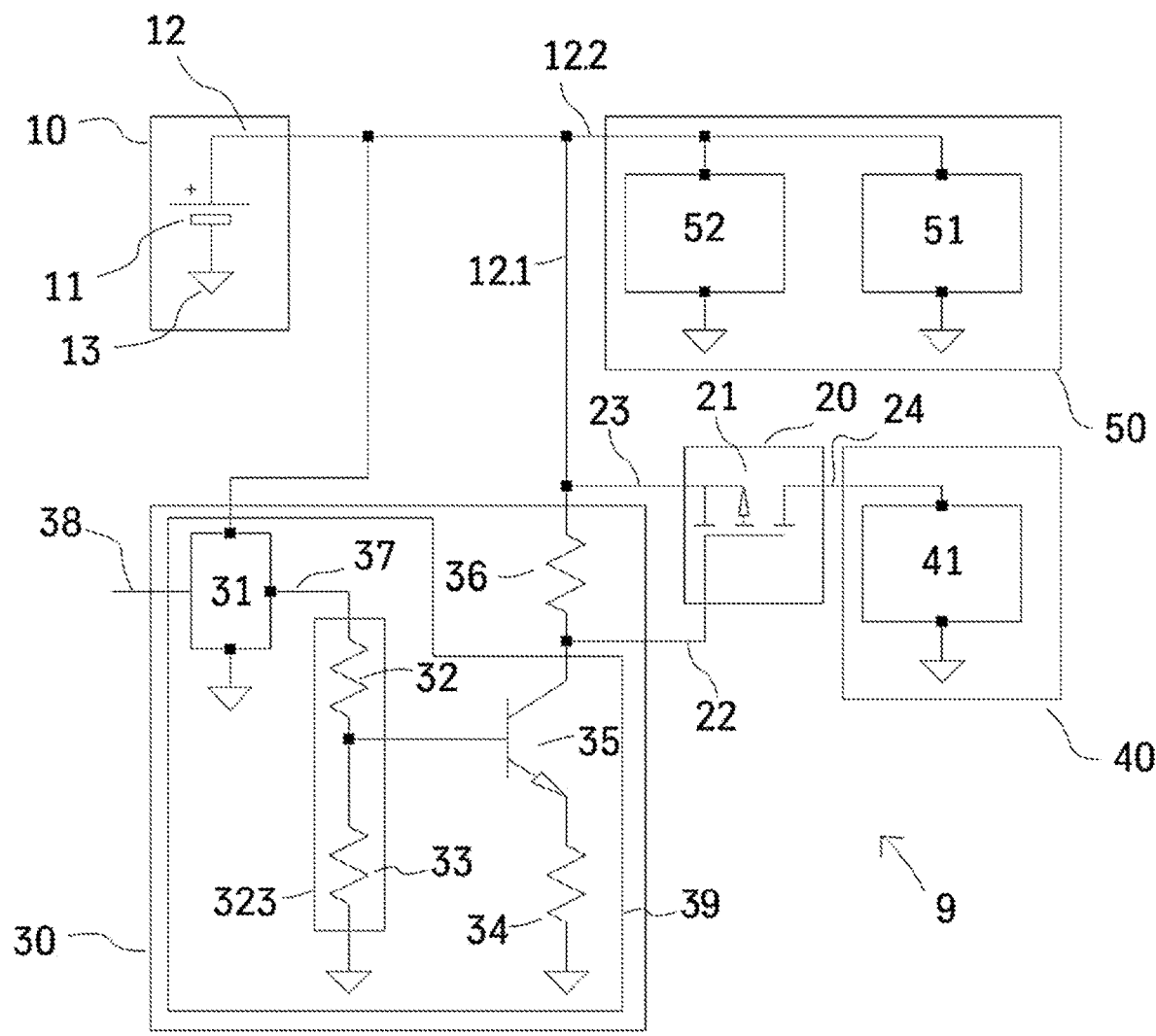
FIG. 3 is a circuit diagram for an example motor vehicle control device.

FIG. 3 shows, by way of example, a schematic circuit diagram for a motor vehicle control device 9 according to FIGS. 1 and 2. In the circuit diagram, the supply voltage source 10 is in the form of a battery 11 which is connected, on the one hand, to the ground 13 of the vehicle electrical system and provides, at its second pole, a supply voltage 12, to which the motor vehicle control device 9 is connected. In the motor vehicle control device 9, the supply voltage 12 branches into two supply voltage paths 12.1 and 12.2. The first supply voltage path 12.1 is used to supply a switchable load 40, for example a steering actuating drive 41. The second supply voltage path 12.2 is used to supply direct loads 50, for example steering angle sensors 51, 52.

An electronic switching element 20 which, in the exemplary embodiment shown, is in the form of a MOSFET 21 is provided in the first supply voltage path 12.1 for the purpose of switching the load 40 on and off. A P-channel MOSFET is preferably used. The source connection 23 of the MOSFET 21 is connected to the supply voltage 12 and the drain connection 24 of the MOSFET 21 is connected to the load 40. The load 40 can therefore be switched to a zero-voltage state by opening the MOSFET 21.

A control unit 30 is provided for the purpose of controlling the switching element 20. The control unit 30 contains a resistor 36 which is connected between the source connection 23 and the gate connection 22 of the MOSFET 21. A current flowing through the resistor 36 therefore generates a voltage difference at the resistor 36, which is used as the control signal for the electronic switching element 20.

The control unit 30 also contains a current control means 39 which is connected to the resistor 36 and can be used to specify the current flowing through the resistor 36. The current control means 39 comprises a controlled voltage source 31 which is connected, for example, to the supply voltage 12 and additionally has an input connection for an input signal 38. The controlled voltage source 31 generates a lower controlled output voltage 37 on the basis of a higher vehicle electrical system voltage. The higher vehicle electrical system voltage can be provided by the battery 11 or any desired other voltage source.

The output voltage 37 of the controlled voltage source 31 is controlled by way of the input signal 38, for example an ignition signal of the motor vehicle. In the simplest case, the voltage source 31 outputs an output voltage 37 only when the input signal 38 is switched on. If the input signal 38 is switched off, the voltage source 31 also switches off, with the result that no output voltage 37 is output. In this standby or sleep mode, the quiescent current consumption of the current control means 39 is therefore reduced.

However, it is also conceivable for the controlled voltage source 31 to provide different output voltages 37 depending on the level of the input signal 38.

The current control means 39 also comprises a bipolar transistor 35 having negative feedback. The bipolar transistor 35 may be an npn transistor, in particular. The collector of the bipolar transistor 35 is connected to the resistor 36 and the emitter is connected to a shunt resistor 34. The base of the bipolar transistor 35 is connected, via a voltage divider 323, to the output voltage 37 of the controlled voltage source 31. In the exemplary embodiment illustrated, the voltage divider 323 is formed by the two resistors 32 and 33. In an alternative embodiment, the resistor 33, for example, can be replaced with a diode, for example a light-emitting diode. This makes it possible to at least partially compensate for a temperature drift of the bipolar transistor 35.

Selecting the output voltage 37 and the resistors 32 to 36 makes it possible to predefine the voltage difference occurring at the resistor 36, when the input signal 38 is switched on, to a value which suffices, as the control signal, to turn on the switching element 20. When the input signal 38 is switched off, the output voltage 37 is preferably equal to zero, with the result that a voltage difference then does not occur at the resistor 36 and the switching element 20 disconnects the load 40 from the supply voltage 12.

The circuit diagram of the control unit 30 illustrated in FIG. 3 is distinguished by a particularly simple structure. The control unit 30 is a purely passive analog circuit which does not require its own voltage supply for logic elements, microcontrollers etc. and, at the same time, makes it possible to switch off the load 40 in a consistent and controlled manner irrespective of the level of the supply voltage 12.

The operation of the control unit 30 is described by way of example below for the situation in which the input signal 38 is the ignition signal of the motor vehicle.

When the ignition is switched on, the control unit 30 behaves as a current sink which receives the current from the supply voltage source 10, through the resistor 36, via the collector of the bipolar transistor 35. On account of the current control means 39, this current is a substantially constant, controlled current, with the result that the voltage difference occurring at the resistor 36 is likewise constant. As a result, a defined control signal for the switching element 20 is provided as a gate-source voltage of the MOSFET 21 largely irrespective of the supply voltage 12.

In the case of a normal or increased supply voltage 12 of the supply voltage source 10, the collector current flowing through the resistor 36 virtually does not change within the expected voltage range of the supply voltage source 10, with the result that the gate-source voltage of the MOSFET 21 is constant. In the event of a voltage drop of the supply voltage source 10, the collector current and therefore the voltage difference occurring at the resistor 36 may likewise drop. However, it can be ensured, by the dimensioning of the resistors 32 to 36 and the selection of the output voltage 37, that the voltage difference remains high enough to allow the MOSFET 21 to be switched on as long as the supply voltage 12 does not fall below a defined minimum operating voltage. As a result of the low switch-on resistance of MOSFETs, the voltage difference between the supply voltage 12 and the voltage applied to the drain connection of the MOSFET is negligible. The illustrated circuit therefore does not have a negative effect on the operation of the loads 40 while the ignition is switched on.

When the ignition is switched off, the controlled voltage source 31 is preferably switched off, as a result of which the motor vehicle control device 9 is changed to a standby or sleep mode. A voltage is then no longer applied to the base of the bipolar transistor 35, with the result that a collector current also does not flow into the transistor 35 and the voltage difference at the resistor 36 is negligible. As a result, MOSFET 21 opens, with the result that the load 40 is disconnected from the supply voltage source 10.

By virtue of the solution according to the invention, the operation of the load 40 is not impaired when the ignition signal is switched on and corresponds to a direct connection between the load 40 and the supply voltage source 10 irrespective of the voltage level of the supply voltage source 10. In contrast, when the ignition signal is switched off, the current consumption of the motor vehicle control device 9 is substantially reduced by switching off the loads 40 which are not required when the ignition is switched off.

The above statements accordingly apply to other input signals 38 which characterize the vehicle state.

LIST OF REFERENCE SIGNS

1 Motor vehicle steering system
2 Upper steering shaft

3 Steering wheel
4 Lower steering shaft
5 Steering gear
6 Tie rods
7 Wheels
8 Road
9 Motor vehicle control device
10 Supply voltage source
11 Battery
12 Supply voltage
12.1, 12.2 Supply voltage path
13 Ground
20 Electronic switching element
21 MOSFET
22 Gate connection
23 Source connection
24 Drain connection
30 Control unit
31 Controlled voltage source
32 to 36 Resistors
37 Output voltage
38 Input signal
39 Current control means
323 Voltage divider
40 Load
41 Steering actuating drive
50 Direct load
51, 52 Steering angle sensors

What is claimed is:

1. A motor vehicle control device having a switch-on and switch-off function for an electrical load to be controlled by the motor vehicle control device, the motor vehicle control device comprising:
an electronic switching element configured to be disposed in a supply voltage path of the electrical load; and
a control unit for controlling the electronic switching element, wherein the control unit is configured to provide a control signal for switching the electronic switching element based on an input signal, and wherein the control unit comprises a resistor connected to the supply voltage path and a current control means connected in series therewith for generating a predefinable voltage difference at the resistor as the control signal for the electronic switching element.

2. The motor vehicle control device of claim 1 wherein the current control means comprises a bipolar transistor having negative feedback.

3. The motor vehicle control device of claim 2 wherein a base of the bipolar transistor is connected, via a voltage divider, to a controlled voltage source that provides a controlled output voltage based on the input signal.

4. The motor vehicle control device of claim 1 wherein the electronic switching element is a MOSFET that is controllable by way of the predefinable voltage difference that can be tapped off at the resistor as a gate-source voltage.

5. A motor vehicle control device having a switch-on and switch-off function for an electrical load to be controlled by the motor vehicle control device, the motor vehicle control device comprising:
an electronic switching element configured to be disposed in a supply voltage path of the electrical load; and
a control unit for controlling the electronic switching element, wherein the control unit is configured to provide a control signal for switching the electronic switching element based on an input signal, wherein the input signal is an ignition signal of a motor vehicle, or wherein the electrical load is a steering actuating drive of a motor vehicle, or wherein the electrical load is integrated in the motor vehicle control device.

6. A motor vehicle control device having a switch-on and switch-off function for an electrical load to be controlled by the motor vehicle control device, the motor vehicle control device comprising:
an electronic switching element configured to be disposed in a supply voltage path of the electrical load; and
a control unit for controlling the electronic switching element, wherein the control unit is configured to provide a control signal for switching the electronic switching element based on an input signal, wherein the supply voltage path is a first supply voltage path, wherein the motor vehicle control device comprises a second supply voltage path for uninterrupted power supply of direct loads to be controlled by the motor vehicle control device.

7. The motor vehicle control device of claim 6 wherein at least one of the direct loads is a steering angle sensor of a steering system.

8. The motor vehicle control device of claim 6 wherein at least one of the direct loads is integrated in the motor vehicle control device.

* * * * *